Feb. 3, 1942.   F. B. WILLIAMSON, JR., ET AL   2,271,931
HOSE JOINT
Filed June 19, 1940    2 Sheets—Sheet 1

WITNESS:

INVENTORS
Frederick B. Williamson, Jr.
& Theodore A. Welger
BY
ATTORNEY.

Feb. 3, 1942. F. B. WILLIAMSON, JR., ET AL 2,271,931
HOSE JOINT
Filed June 19, 1940 2 Sheets-Sheet 2

INVENTORS
Frederick B. Williamson, Jr.
& Theodore A. Welger
BY
Augustus B. Stoughton
ATTORNEY.

WITNESS:

Patented Feb. 3, 1942

2,271,931

UNITED STATES PATENT OFFICE 2,271,931

HOSE JOINT

Frederick B. Williamson, Jr., New Hope, Pa., and Theodore A. Welger, Trenton, N. J., assignors to The Whitehead Bros. Rubber Co., Trenton, N. J., a corporation of New Jersey Application June 19, 1940, Serial No. 341,236

4 Claims. (Cl. 285—71)

The principal objects of the present invention are to provide a hose joint devoid of exposed metal and of which the parts are the ends of hose lengths; to construct and arrange the hose ends in such manner that the joint, while severable or detachable, shall be strong and tight under considerable pressure or suction, and to provide a comparatively simple, inexpensive and efficient hose joint.

Other objects of the invention will appear from the following description at the end of which the invention will be claimed.

Generally stated, the invention comprises two hose ends each having a continuous cylindrical wall and of which one is detachably insertable into the other, the first hose end being imperforate and externally of rubber material and having a relatively stiff shank and a relatively flexible end lip, and the second hose end being imperforate and internally of rubber material and having a relatively non-stretchable jacket.

The invention also comprises the improvements to be presently described and finally claimed.

In the following description reference will be made to the accompanying drawings forming part hereof and in which, Figure 1 is a view, partly in section and partly in elevation, of a hose end embodying features of the invention.

Figure 1:
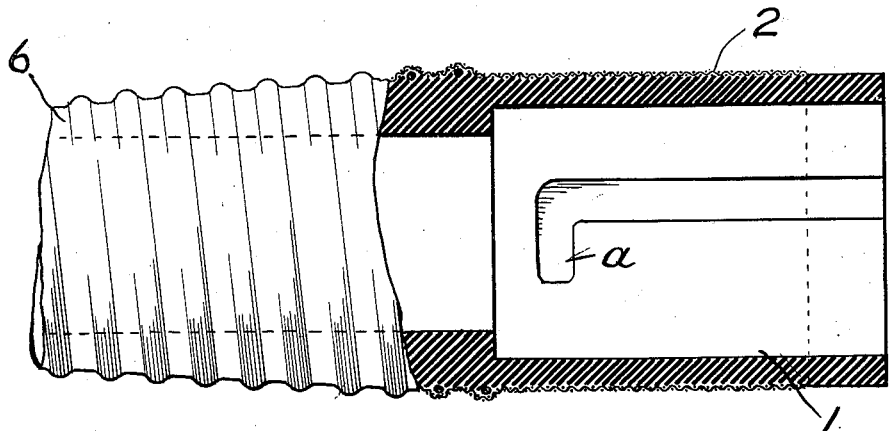

Referring to the drawings, and more particularly to Figure 1, the hose end there shown is internally of rubber material and is generally cylindrical as indicated at 1 and it is shown as provided with a jacket 2 of relatively non-stretchable material as canvas or similar textile fabric.

Figure 2:
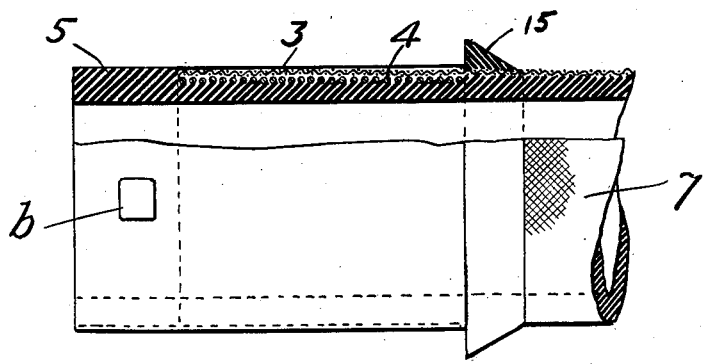
Figure 2 is a similar view of a hose end insertable into the hose end shown in Fig. 1, and embodying features of the invention.
Figure 3:
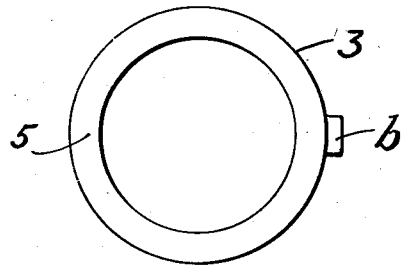
Figure 3 is an end view of Figure 2 looking from left to right.
Figure 4:
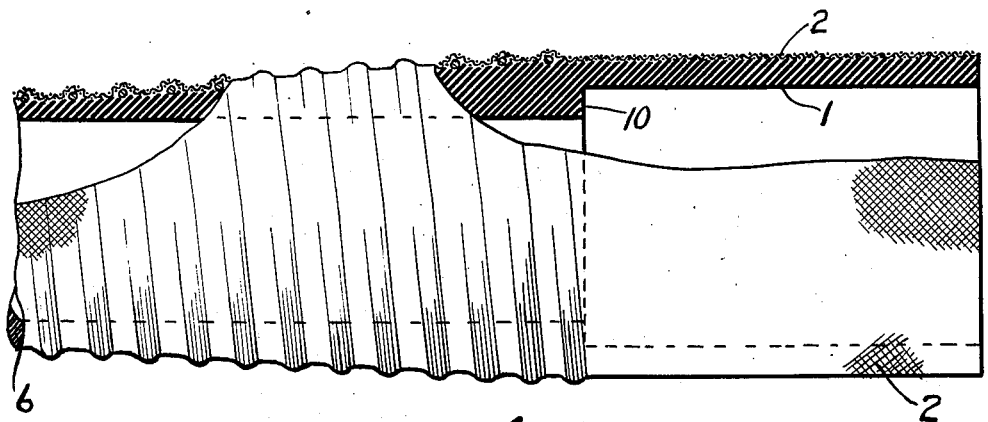
Figure 4 is a view partly in section and partly in elevation of a hose end embodying a modification of the invention.

Referring to Figure 2, the hose end is externally of rubber material and is generally cylindrical as at 3 and it is illustrated as provided with a metal reenforcement 4 shown as a spiral coil of wire buried in the wall of the hose. This reenforcement stops short of the end and provides at the termination of the hose end a rubber lip 5. The lengths of hose 6 and 7 may be of conventional construction and they are shown as internally of rubber having a metal reenforcement or wire winding and covered with textile material or canvas.

The internal diameter of the hose end shown in Figure 1 and the external diameter of the hose end shown in Figure 2 are substantially the same so that one may be inserted in the other and provide a tight fit. As shown in Figure 1, the hose end is provided with the groove element $a$ of a bayonet joint, and the complemental key or rib element $b$ of the bayonet joint is provided on the exterior of the hose end shown in Figure 2. The elements $a$ and $b$ of the bayonet joint may be provided by molding them in the rubber material, and element $b$ may be located at the lip 5 to facilitate its engagement and disengagement with the element $a$ by a slight turn of the hose ends in respect to each other. The purpose of the bayonet joint is to oppose separation of the hose ends.

Figure 5:
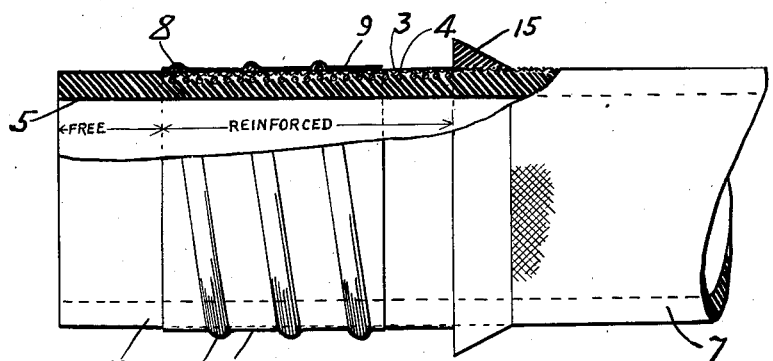
Figure 5 is a similar view of a hose end embodying a modification of the invention and insertable in the hose end shown in Figure 4.

As shown in Figure 5 the hose end is provided with a spiral rib 8, presenting a face of rubber material. As shown in the drawings, it consists of a wire winding covered with rubber material such as rubber or friction tape 9.

When one hose end is inserted in the other hose end their meeting faces are substantially of rubber or rubber material and the fit is quite tight. When the hose ends are subjected to external pressure the reenforcement 4 opposes substantial contraction of the diameter of that end, and when subjected to internal pressure the jacket 2 opposes substantial enlargement of the external diameter of the other hose end, so that pressure forces the contacting rubber material into very close contact. The free lip 5 under pressure may operate to hug the rubber wall which encircles it tightly. The rib or ribs 8 under pressure or suction are sufficiently rigid to become embedded in the rubber wall which encircles them, it being remembered that the jacket 2 opposes expansion of the rubber part of the hose end which it encircles.

As shown in the drawings, the construction is such that an internally projecting shoulder 10 is provided and when present it serves as an abutment for the flexible lip 5.

Figure 6:
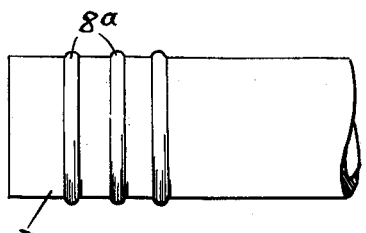
Figures 6 and 7 are views in elevation of modifications of the structure shown in Figure 5.
Figure 7:
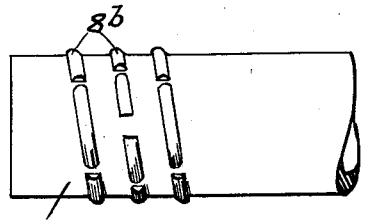

The construction and mode of operation of the modifications shown in Figures 6 and 7 are as above described except that in Figure 6 the rib 8ᵃ is shown in the form of rings, and in Figure 7 the rib 8ᵇ is shown as discontinuous.

Figure 8:
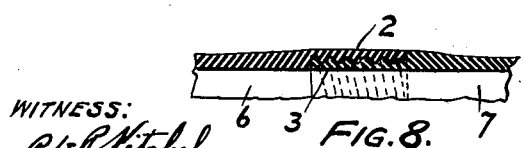
Figure 8 is a detached sectional view illustrating a modification of the structure shown in Figure 4.

The construction and operation of the modification shown in Figure 8 are as above described except that the continuous internal and external rubber surfaces are respectively provided with the elements of a screw-thread. As shown the screw-thread is truncated so that its elements present comparatively flat meeting surfaces and rounded meeting surfaces respectively.

By way of explanation and not limitation a hose joint substantially as described will withstand fifty pounds to the square inch bursting pressure and it is obviously well adapted to convey liquids or fluids that would attack metal, such as is employed in ordinary hose couplings. Furthermore, the described joint is comparatively inexpensive to make while at the same time it is detachable and efficient.

In Figs. 2 and 5 there is shown on the inner hose end a collar or flange 15 generally wedge-shaped in cross-section and high enough at its thickest portion to lie substantially flush with the surface of the outer hose end, thus serving to facilitate the movement of the hose above a floor or the ground and also serving as a means for aligning the element $b$, with the crosswise ranging portion of the element $a$, Figs. 1 and 2.

The shank of the inner hose end is comparatively rigid while the tip or lip at the end thereof is comparatively flexible and this construction facilitates the insertion of the inner hose end with the bore of the outer hose end.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. A hose joint in which no metal is exposed consisting of two rubber hose end parts each having an imperforate bounding wall and of which one is detachably insertable into the other, the contacting surfaces of said end parts being of rubber and providing sufficient friction between them to hold the end parts together and to permit of their manual separation under normal conditions, and a non-stretchable textile jacket incorporated in the outer end part and disposed away from the rubber surface, and opposing diametrical expansion of that end part, and a wire reenforcement incorporated in the inner end part and beneath the rubber surface and opposing diametrical contraction of that end part to maintain the frictional contact at the contacting surfaces when the joint is under internal or external pressure.

2. A hose joint in which no metal is exposed consisting of two rubber hose end parts each having an imperforate bounding wall and of which one is detachably insertable into the other, the contacting surfaces of said end parts being of rubber and providing sufficient friction between them to hold the end parts together and to permit of their manual separation under normal conditions, and a non-stretchable textile jacket incorporated in the outer end part and disposed away from the rubber surface, and opposing diametrical expansion of that end part, and a wire reenforcement incorporated in the inner end part and beneath the rubber surface and opposing diametrical contraction of that end part to maintain the frictional contact at the contacting surfaces when the joint is under internal or external pressure, the inner end part having a cylindrical rubber lip extending beyond the reenforcement and adapted to expand diametrically under internal pressure and maintain the friction where it contacts with the inner rubber face of the outer end part.

3. A hose joint in which no metal is exposed consisting of two rubber hose end parts each having an imperforate bounding wall and of which one is detachably insertable into the other, the contacting surfaces of said end parts being of rubber and providing sufficient friction between them to hold the end parts together and to permit of their manual separation under normal conditions, and a non-stretchable textile jacket incorporated in the outer end part and disposed away from the rubber surface and opposing diametrical expansion of that end part, and a wire reenforcement incorporated in the inner end part and beneath the rubber surface and opposing diametrical contraction of that end part to maintain the frictional contact at the contacting surfaces when the joint is under internal or external pressure, the inner hose end part provided with an outwardly projecting flange generally wedge shaped in cross section and positioned in the path of the outer hose end part, the radial portion of the flange confronting the end wall of the outer end part and substantially corresponding in height to its thickness, to facilitate the movement of the outer end part along the surface of a floor or the ground.

4. A hose joint comprising two hose ends of which one is detachably insertable into the other, the first hose end being externally of rubber material and having a relatively stiff shank and a relatively flexible end lip, and the second hose end being internally of rubber material, the outer hose end internally provided with a bayonet joint groove element having a crosswise ranging portion and the inner hose end provided externally with the key element of the bayonet joint, the inner hose end provided with an outwardly projecting annular flange generally wedge shaped in cross section and positioned in the path of the outer hose end, the straight portion of the flange confronting the outer hose end and substantially corresponding in height to its thickness and serving as a stop to position the key element in line with the crosswise ranging portion of the groove.

FREDERICK B. WILLIAMSON, Jr.
THEODORE A. WELGER.